Oct. 13, 1931.   W. S. LIENHARDT   1,826,800
METHOD OF MAKING STANNIC CHLORIDE
Filed Aug. 27, 1929
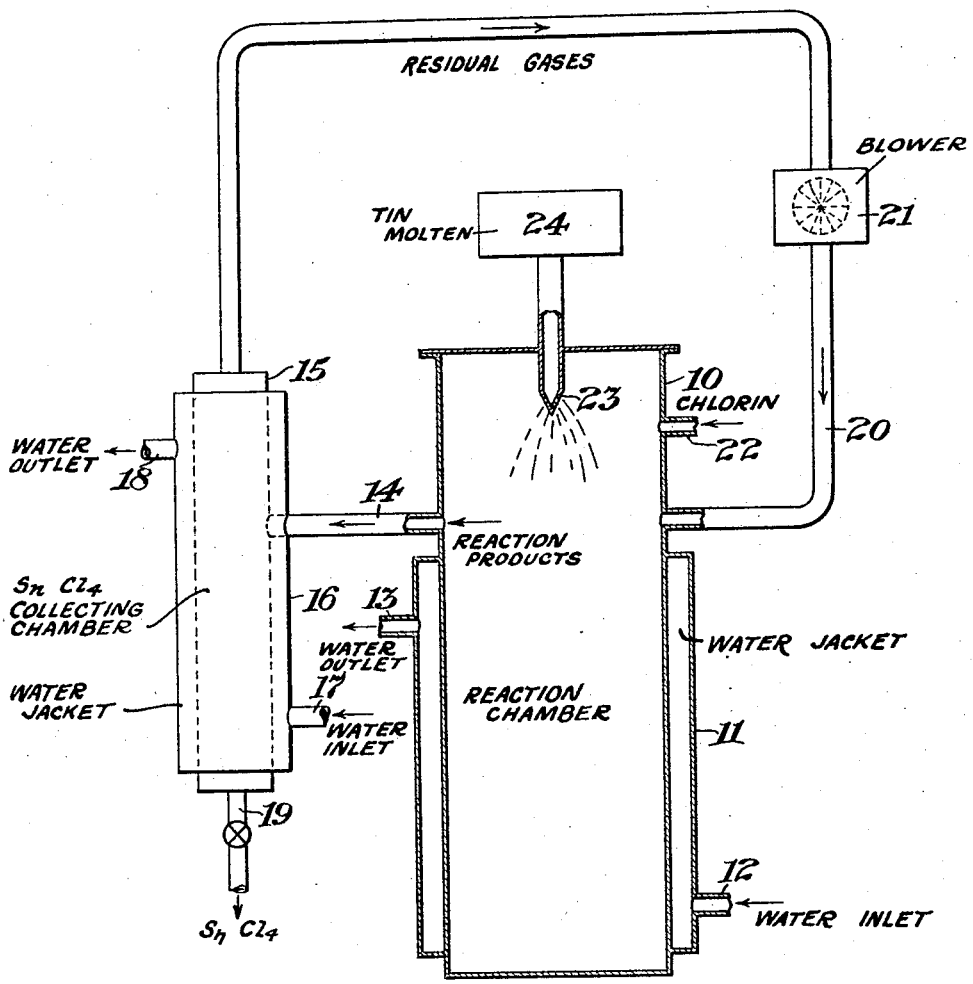
INVENTOR
Winfield S. Lienhardt
BY
HIS ATTORNEY Patented Oct. 13, 1931

1,826,800

UNITED STATES PATENT OFFICE

WINFIELD SCHLEY LIENHARDT, OF STAPLETON, NEW YORK

METHOD OF MAKING STANNIC CHLORIDE

Application filed August 27, 1929. Serial No. 388,671.

This invention relates to methods of making stannic chloride, and it comprises a process of producing stannic chloride from tin and chlorin wherein molten tin is chlorinated as a free burning flame or spray in an unobstructed chamber containing a replenished atmosphere of chlorin, said atmosphere being cyclically circulated to, through and back from cooling devices adapted to condense and remove vapors of stannic chloride; all as more fully hereinafter set forth and as claimed.

Stannic chloride is commercially produced from tin and chlorin. In the usual operation, solid tin is chlorinated in a chamber containing liquid stannic chloride. In so doing the temperature cannot rise above the boiling point of $SnCl_4$, or 114° C., and as dry chlorin does not attack iron at this or lower temperatures, simple iron or steel apparatus can be used. The process is, however, not well adapted for large scale operation and rapid work. In order to keep the temperature down, it is necessary to use relatively small apparatus units, and the rate of operation is restricted by the necessity for disposing of the heat evolved in chlorination, and further, usually, by the rate at which chlorin dissolved in tin chloride gains access to the tin. In most of these processes the actual chlorinating agent is a stannic chloride solution of chlorin. There also are mechanical difficulties in replenishment with solid tin in continuous operation without permitting escape of poisonous gases and vapors. The apparatus is better adapted for batch operation than for continuous operation.

It is the purpose of the present invention to enable continuous large scale operation without the necessity for maintenance of any low or particular temperature in the zone of reaction. Molten tin takes fire on contact with chlorin and burns freely with formation of vapors of $SnCl_4$. Advantage is taken of this fact in the present invention, a spray or jet of molten metallic tin being directed axially down into an unobstructed chamber containing chlorin. The tin takes fire and burns as a sort of free flame where the spray is of proper character. In any event, with a chamber of reasonable depth droplets of tin are burnt during fall. Development of heat is at a point remote from the chamber walls and the high temperatures developed in the flame do no harm. The whole chamber may be of water cooled iron or steel, or it may be of chlorin resistant ceramic material. The combustion produces vapors of stannic chloride, and to secure a sharply defined quick burning flame with localized development of heat it is desirable to maintain the concentration of $SnCl_4$ in the chamber atmosphere as low as may be. To his end, the chamber atmosphere is kept circulating in a closed circuit through chilling coils where the $SnCl_4$ is condensed and removed.

In the described operation enormous capacity can be secured with relatively small and simple apparatus. Capacity does not depend in any way upon the size of the chlorinating chamber which need be only large enough to provide proper spacing of the tin flame, and the only limitation is the speed with which the chamber gases can be rushed through the chilling coils.

In the accompanying illustration I have shown, more or less diagrammatically, an organization of apparatus elements within the present invention and capable of use in performing the described process. In this showing the view is partly in section and partly in elevation.

In the showing, element 10 is a casing of iron or steel, which, as shown, is water jacketed, being provided with jacket 11 having water inlet 12 and outlet 13. This casing defines a vertically elongated reaction chamber, the downward extension giving ample free fall to admit chlorination of any coarse tin drops coming from the jet. It also acts to collect at its bottom any chlorides, such as lead chloride, formed from impurities in the tin. As shown, the casing is provided with an outlet conduit 14 leading chamber gases to a chilling and collecting chamber 15, jacketed by casing 16, provided with water inlet 17 and outlet 18. At the bottom, the collecting chamber 15 is provided with a valved liquid outlet 19 and at the top connects with circulating pipe 20 leading past blower 21 back to the reaction chamber. Chlorin is supplied to the reaction chamber through inlet 22 and tin through nozzle 23, supplied with molten tin from reservoir 24.

In operation, molten tin is sprayed or fed into the hot chamber through nozzle 23 and burns as a flame at the expense of the chamber chlorin and of that entering through inlet 22. It is simpler to introduce the tin and chlorin as two neighboring jets rather than send both through a spray nozzle, and quite as effective. Circulating pump 21 being in operation, chamber gases are sent through cooler 15 and stripped of $SnCl_4$, being then returned to the reaction chamber. The gases leaving through 14 being hotter than those returned through 20, there is an advantageous convectional circulation within the chamber below the end of the tin flame. Chlorin inlet 22 supplies fresh chlorin directly to the tin flame. The maximum concentration of $SnCl_4$ in the chamber atmosphere is always at points well below the tin flame.

What I claim is:

1. In the manufacture of stannic chloride from tin and chlorin in a continuous manner, the process which comprises spraying molten tin into an atmosphere of chlorin, withdrawing the reaction mixture, cooling the reaction mixture to condense and separate stannic chloride from uncombined chlorin, and returning the uncombined chlorin to react with another portion of molten tin.

2. In the manufacture of stannic chloride from tin and chlorin in a continuous manner, the process which comprises spraying molten tin into an atmosphere of chlorin, withdrawing the gaseous reaction mixture, cooling it to condense and separate stannic chloride from the uncombined chlorin, returning the uncombined chlorin to the reaction zone, and introducing fresh chlorin to compensate for chlorin consumed in the process.

In testimony whereof I affix my signature.

WINFIELD SCHLEY LIENHARDT.